March 17, 1964 W. V. SORNSEN 3,125,325
PNEUMATIC TIRE SPREADER
Filed Nov. 7, 1962 3 Sheets-Sheet 2
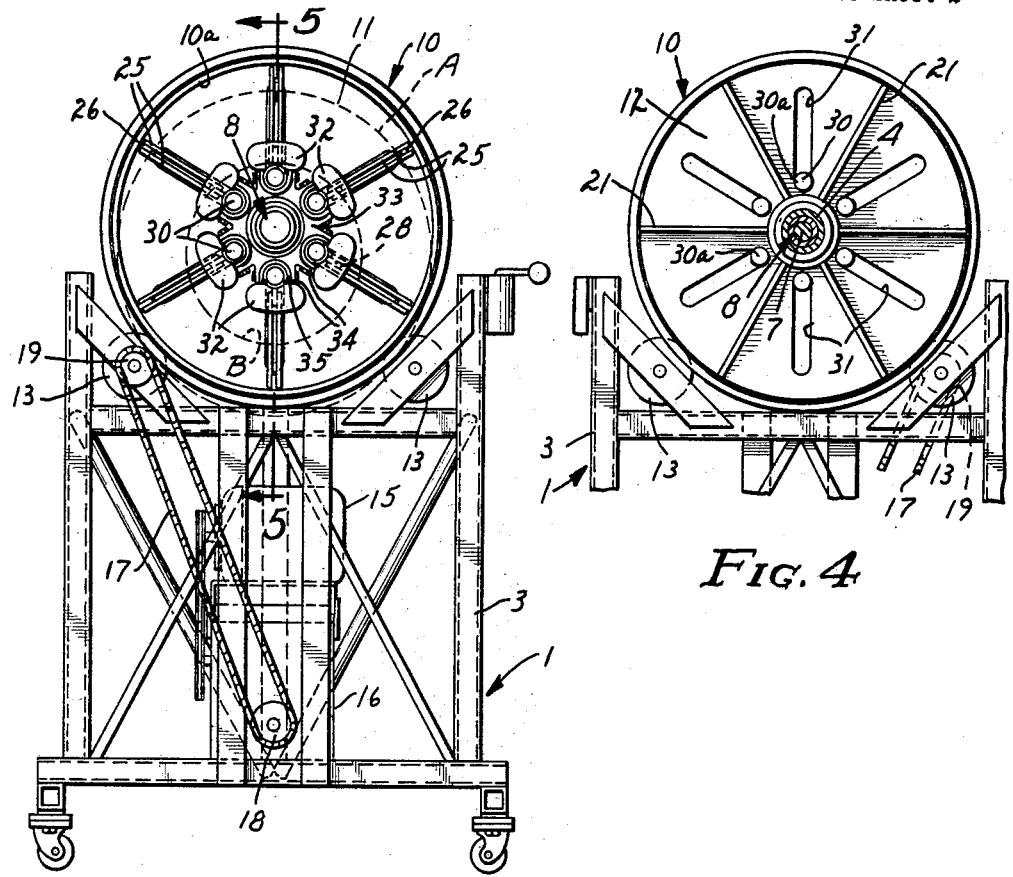
FIG. 2
FIG. 4
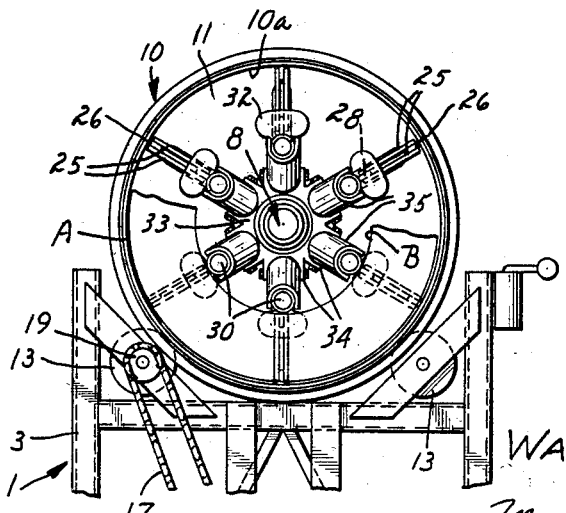
FIG. 3
INVENTOR.
WALLACE V. SORNSEN
BY
Merchant, Merchant & Gould
ATTORNEYS March 17, 1964     W. V. SORNSEN     3,125,325
PNEUMATIC TIRE SPREADER
Filed Nov. 7, 1962     3 Sheets-Sheet 3

INVENTOR.
WALLACE V. SORNSEN
BY
ATTORNEYS

United States Patent Office 3,125,325
Patented Mar. 17, 1964

3,125,325
PNEUMATIC TIRE SPREADER
Wallace V. Sornsen, Minneapolis, Minn., assignor to Paul E. Hawkinson Company, Minneapolis, Minn., a corporation of Minnesota
Filed Nov. 7, 1962, Ser. No. 236,002
2 Claims. (Cl. 254—50.4)

My invention relates to improvements in pneumatic tire spreaders of the so-called inside-arm type and is in the nature of an improvement upon or modification of the structure disclosed in my Patent No. 3,043,565 issued July 10, 1962, for "Pneumatic Tire Spreader."

The structure of my above-identified patent has certain inherent limitations which make it unsuitable for the spreading and rotating (for purposes of examination) of heavy duty tires, and the primary object of my present invention is the redesigning of the structure of my said patent so as to enable same to be capable of spreading and rotating earth mover and other large-sized heavy duty pneumatic tires.

A further object of my invention is the provision of a structure of the type immediately above described which reduces to a minimum the manual effort required to spread and inspect pneumatic tires in the larger range of sizes.

A still further object of my invention is the provision of a device of the class above described which may be produced by a reasonable expenditure of time and money and which is rugged and durable in construction.

A still further object of my invention is the provision of a device of the class described which is not unduly heavy and bulky for ease of storage and shipment and which is highly efficient in its operation.

The above and still further objects of my invention will become apparent from the following detailed specification, appended claims and attached drawings.

Referring to the drawings wherein like characters indicate like parts throughout the several views:

FIG. 2 is a view in front elevation;

FIG. 3 is a view corresponding to FIG. 1 but showing a different position of some of the parts, some parts being broken away;

FIG. 4 is a view in vertical section taken substantially on the line 4—4 of FIG. 1;

Figure 1:
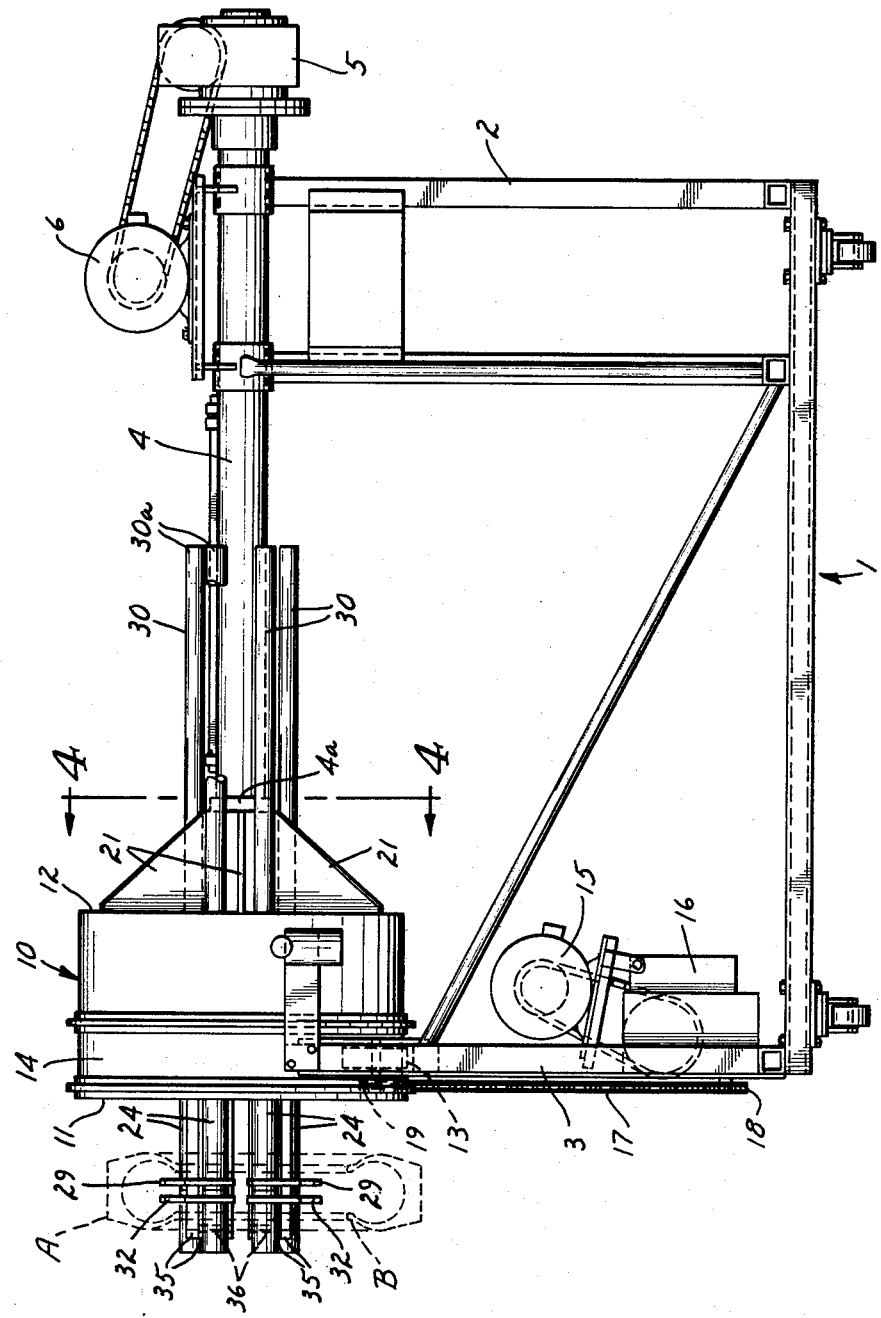
FIG. 1 is a view in side elevation of my novel spreader.

Referring with greater particularity to the drawings, the numeral 1 indicates in its entirety a mobile base frame. Carried by the base frame 1 and extending generally axially thereof from its rear end 2 toward its front end 3 is a horizontally disposed elongated tubular housing 4. Journalled for rotation within the housing 4 with one end in driving engagement with a gear reduction box 5 associated with an electric motor 6 or the like, is a rotary screw element 7 which forms the rear end of an extensible and retractable member 8. Having screw-threaded engagement with the rotary screw element 7, forming a forward extension thereof and being extensible and retractable with respect thereto, is the forward end portion 9 of the extensible and retractable member 8.

Mounted for rotation about the axis thereof and on the forward end portion 3 of the frame 1 is a forwardly opening cup-like mounting member 10. The open forward end of mounting member 10 is identified by 11 whereas the closed rear end wall thereof is designated by 12. The means mounting said mounting member 10 for rotation about its axis comprises a pair of laterally spaced roller element 13 carried by said frame 1 and which run in an annular channel 14 adjacent the open front 11 thereof. Suitable power for imparting rotation to the mounting member 10 is shown as being derived from an electric motor 15, a gear reduction box 16 in driving connection therewith, and a flexible endless link chain 17 or the like entrained over sprockets 18 and 19, respectively, associated with the gear reduction box 16 and one of the roller elements 13.

Figure 5:
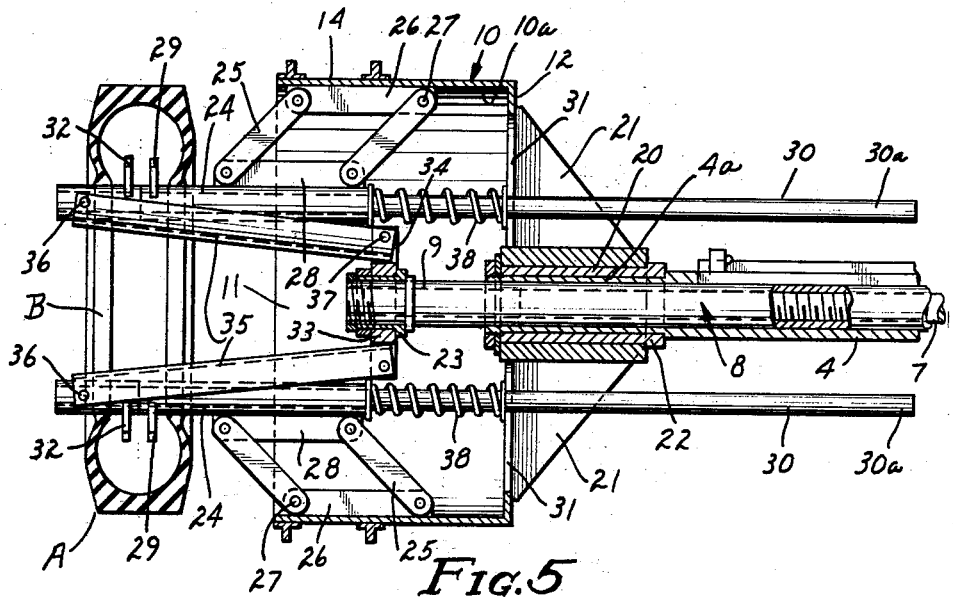
FIG. 5 is a view in vertical axial section taken substantially on the line 5—5 of FIG. 2, on a slightly enlarged scale.
Figure 6:
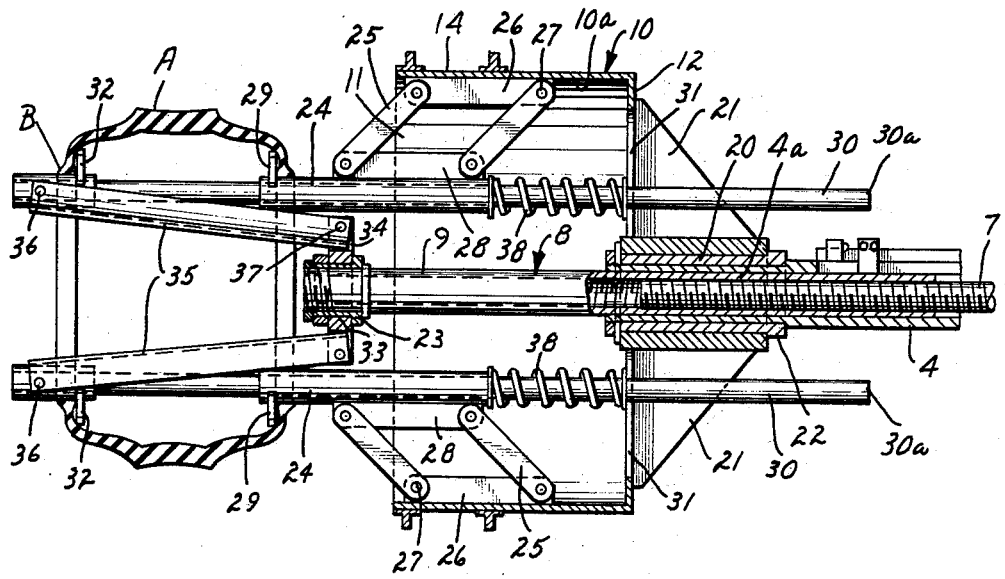
FIG. 6 is a view corresponding to FIG. 5 but showing a different position of some of the parts.

Referring particularly to FIGS. 5 and 6 it will be noted that the forward end portion 9 of the extensible member 8 is mounted for sliding movements through the closed rear wall 12 of the mounting member 10, axially of said mounting member 10. Specifically this is accomplished through the medium of a tubular bearing member 20 which is concentric with and mounted for rotation upon the forwardly extended end 4a of the housing 4 and which is secured fast to the rear wall 12. Preferably, a plurality of circumferentially spaced radially extending reinforcing plates 21 are provided between the rear wall 12 and the tubular bearing 20. Thrust bearings 22 and 23, respectively, limit axial movements of the mounting member 10 with respect to the housing 4 and forward end portion 9 of the extensible and retractable member 8.

A plurality of bearings sleeves 24 are secured to the inner surface of the cylindrical wall 10a of the mounting member 10 through the medium of pairs of circumferentially spaced parallel links 25. As shown, one end of the links are pivotally secured to plate-like bracket members 26 rigidly secured to the wall 10a, as indicated at 27, whereas the opposite ends are pivotally secured to ears 28 fast on the bearing sleeves 24. In this manner the bearing sleeves 24 are pivoted for swinging movements toward and away from the axis of the extensible and retractable member 8 while being maintained in a parallel relationship with respect to said axis. At their forward ends each of the bearing sleeves 24 are provided with bead-engaging spreader elements 29.

A plurality of elongated mounting arms 30 have their intermediate portions slidably received one each within one of said bearing sleeves 24. The rear end portions 30a of the arms 30 project loosely through radially extended slots 31 in the rear wall 12, whereas their forward ends are provided with tire bead engaging spreader elements 32, one each of which is adapted to cooperate respectively with an opposed spreader element 29 carried by the bearing sleeves 24.

Mounted for rotation on the extreme forward end of element 9 of the extensible and retractable member 8 is a collar 33 having circumferentially spaced ears 34 thereon. A plurality of circumferentially spaced actuator links 35 have their forward end portions pivotally secured, as at 36, to the forward end portions of the arms 30. The rear end portions of said actuator links 35, on the other hand, are pivotally secured, as at 37, to the ears 34.

For a purpose which will hereinafter be explained in detail, a plurality of coiled compression springs 38 interposed between the rear wall 12 of the mounting member 10 and the rear end portions of the bearing sleeves 24, bias said arms 30 and parts carried thereby toward a radially outwardly swung position with respect to the axis of member 8.

Operation

The control mechanism for imparting rotation to the rotary screw element 7, whereby to cause extending and retracting movements of the forwardly disposed element 9, form no part of the instant invention and will not be described in detail in view of the fact that they are so described in my above-identified patent. It suffices to state that when it is desired to spread the beads B of a tire casing A, the extensible and retractable element 8 is caused to assume a retracted position so as to closely space the spreader arms 30, as shown in FIGS. 1 and 2. The tire A having then been placed over the extended forward ends of the arms 30 with the spreader elements 29, 32 interposed between the beads B, initial extending movements of the member 8 will cause each of the arms 30 to swing radially outwardly to engage the beads B, due to the yielding bias of the springs 38 against the bearing sleeves 24. Thereafter, further extending movements of the member 8 will cause the bead-engaging spreader elements 29 and 32 to be spaced axially apart, as shown in FIG. 6, to spread the beads B apart for purposes of inspection or repair of the tire casing A. Rotation of casing A may be achieved by imparting suitable rotary movements to member 10 through motor 15 and drive mechanism associated therewith, as above described.

What is claimed is:

1. In a tire spreader,
   (a) a base frame,
   (b) a horizontally disposed forwardly opening cup-like mounting member,
   (c) means journalling said mounting member for rotation about the axis thereof,
   (d) an elongated extensible and retractable member carried by said base frame and having its extendable forward end mounted for sliding movements in the closed inner end of said cup-like mounting member axially thereof,
   (e) a plurality of circumferentially spaced bearing sleeves mounted within said cup-like member for limited swinging movements toward and away from said extensible and retractable member in parallel relationship to said member,
   (f) the outer end portions of each of said bearing sleeves being formed to provide radially outwardly projecting spreader elements,
   (g) parallel linkage connected to each of said sleeves and the side wall of said cup-like mounting member,
   (h) a plurality of elongated mounting arms, each arm having an intermediate portion slidably received within one of said bearing sleeves, the inner end portions of each of said mounting arms being received and guided in radially extended slots in the closed inner end of said mounting member and the outer ends thereof being provided with spreader elements which cooperate with the spreader elements carried by said bearing sleeves,
   (i) a collar mounted on the forward end of said extensible and retractable member,
   (j) a plurality of actuator links one each pivotally connected at its outer end to the outer end of a different one of said spreader elements of said mounting arms and pivotally connected at their inner ends to said collar, and
   (k) yielding means biasing said bearing sleeves toward their radially extended positions.

2. The structure defined in claim 1 in further combination with power means for imparting rotation to said cup-like mounting member about the axis thereof.

References Cited in the file of this patent

UNITED STATES PATENTS

| | | |
|---|---|---|
| 2,905,435 | Hawkinson | Sept. 22, 1959 |
| 2,928,119 | Fassero et al. | Mar. 15, 1960 |
| 3,043,565 | Sornsen | July 10, 1962 |